United States Patent [19]
Takahata et al.

[11] Patent Number: 5,376,610
[45] Date of Patent: Dec. 27, 1994

[54] CATALYST FOR EXHAUST GAS PURIFICATION AND METHOD FOR EXHAUST GAS PURIFICATION

[75] Inventors: Toshio Takahata, Aikawa; Hideharu Ehara, Yokohama; Fuminori Yamanashi, Setagaya; Katsuhiro Shibata, Machida; Fumio Abe, Handa; Tomoharu Kondo, Toki; Junichi Suzuki, Kuwana; Naomi Noda, Ichinomiya, all of Japan

[73] Assignees: Nissan Motor Co., Ltd.; NGK Insulators, Ltd., both of Japan

[21] Appl. No.: 45,083

[22] Filed: Apr. 12, 1993

[30] Foreign Application Priority Data

Apr. 15, 1992 [JP] Japan .................. 4-095245
Apr. 15, 1992 [JP] Japan .................. 4-095246

[51] Int. Cl.$^5$ ............... B01J 29/04; B01J 23/40; B01J 35/04
[52] U.S. Cl. .................... 502/66; 502/65; 502/304; 502/527; 423/213.7
[58] Field of Search ............ 502/65, 66, 304, 527; 423/213.7

[56] References Cited

U.S. PATENT DOCUMENTS

| | | | |
|---|---|---|---|
| 4,099,377 | 7/1978 | Toshimura et al. | 60/276 |
| 4,170,112 | 10/1979 | Bessho | 60/278 |
| 4,183,212 | 1/1980 | Takagi | 60/274 |
| 4,448,756 | 5/1984 | Hammerle et al. | 423/213.7 |
| 5,010,051 | 4/1991 | Rudy | 502/304 |

FOREIGN PATENT DOCUMENTS

| | | |
|---|---|---|
| 0427494 | 5/1991 | European Pat. Off. |
| 0428752 | 5/1991 | European Pat. Off. |
| 0443765 | 8/1991 | European Pat. Off. |
| 0462593 | 12/1991 | European Pat. Off. |
| 0485180 | 5/1992 | European Pat. Off. |
| 0488716 | 6/1992 | European Pat. Off. |
| 63-84635 | 4/1988 | Japan . |
| 2-56247 | 2/1990 | Japan . |
| 3-72953 | 3/1991 | Japan . |
| 3-101813 | 4/1991 | Japan . |
| 3-38892 | 6/1991 | Japan . |

*Primary Examiner*—Carl F. Dees
*Attorney, Agent, or Firm*—Parkhurst, Wendel & Rossi

[57] ABSTRACT

A catalyst for exhaust gas purification has at least one monolith carrier, at least one first catalyst layer having a three-way catalytic activity, provided on the carrier, and a second catalyst layer having a hydrocarbon purification activity, provided on the first catalyst layer. In a gasoline engine automobile provided with the above catalyst for exhaust gas purification in the exhaust gas system, the hydrocarbons present in the exhaust gas can be converted at a high efficiency by introducing secondary air into the exhaust gas in front of the catalyst to make the exhaust gas lean, at the engine start when a large amount of unburnt hydrocarbons are present in the exhaust gas. Further, the engine warm-up property of the automobile can be improved by the heat generated by the catalytic reaction of the hydrocarbons. The catalyst further exhibits a three-way catalytic activity even during the steady state engine operation after warm-up.

52 Claims, 3 Drawing Sheets

CATALYST FOR EXHAUST GAS PURIFICATION AND METHOD FOR EXHAUST GAS PURIFICATION

BACKGROUND OF THE INVENTION AND RELATED ART

The present invention relates to a catalyst for exhaust gas purification and a method for exhaust gas purification using the catalyst, particularly to a catalyst for exhaust gas purification which can be suitably used in automobile internal combustion engines and a method for exhaust gas purification using the catalyst. More particularly, the present invention relates to a catalyst for exhaust gas purification which can preferably convert unburnt hydrocarbons (HC) which are present in a large amount in the exhaust gas of gasoline engine automobile at the engine start (i.e. cold start), in the presence of secondary air and, after the engine start, can convert hydrocarbons, carbon monoxide (CO) and nitrogen oxide ($NO_x$) at a high efficiency stably for a long period of time, and a method for exhaust gas purification using the catalyst.

As regulation for automobile exhaust gas emissions has become stricter, attention is being paid to a technique of arranging a catalyst in the vicinity of engine manifold to improve the catalyst's warm-up property or a technique of using an electrically heated catalyst (EHC) to give rise to quick temperature increase to (1) heat a catalyst supported on the EHC or a catalyst arranged downstream of the EHC, for example, a main catalyst and thereby (2) convert unburnt hydrocarbons which are present in a large amount in the exhaust gas from a gasoline engine of an automobile at the engine start.

There was also proposed a technique of, in addition to the above-mentioned improvement of catalyst's warm-up property at engine start, introducing secondary air to make the exhaust gas leaner than the stoichiometric air-fuel ratio (air excess ratio $\lambda=1$) when the exhaust gas is at a fuel-rich side and conduct improved purification of exhaust gas.

An example of the catalysts used in the above techniques for exhaust gas purification is disclosed in Japanese Patent Publication No. 38892/1991. It is a three-way catalyst comprising
a catalyst carrier,
a catalyst layer containing at least either of Pt and Rh as the catalyst component, provided on the carrier, and
an alumina layer containing 50–95% of $CeO_2$ as an oxygen storability-imparting agent and a small amount of Pd, provided on the catalyst layer.

Catalysts each supported on an electrically heated catalyst (EHC) are disclosed as catalysts for exhaust gas purification, in Japanese Utility Model Application Kokai (Laid-open) No. 67609/1988, Japanese Patent Application Kohyo No. 500911/1991 and Japanese Patent Application Kokai (Laid-open) No. 72953/1991.

Further in Japanese Patent Application Kokai (Laid-open) No. 56247/1990, there is disclosed a three-way catalyst which shows a high conversion efficiency particularly for hydrocarbons in an exhaust gas of stoichiometric to fuel-rich air-fuel ratio at cold start. This catalyst for exhaust gas purification comprises
a carrier,
a first catalyst layer composed mainly of zeolite, provided on the carrier, and
a second catalyst layer provided on the first catalyst layer, having an oxidizing and reducing activity and comprising a noble metal (e.g. Pt, Pd and Rh) supported on a coating layer of $Al_2O_3$ or the like.

Further in Japanese Patent Application Kokai (Laid-open) No. 84635/1988, there is disclosed a three-way catalyst wherein the kinds and amounts of supported catalyst metals are different at the exhaust gas inlet and the exhaust gas outlet. It is a catalyst for exhaust gas purification which is intended for improved purification of an exhaust gas generated, for example, at cold start (low temperature) and which comprises
a monolith carrier,
Pd supported on the gas inlet portion of the carrier over the 1/10 to 2/5 length of the total carrier length, and
Pt supported on the gas outlet portion of the carrier over the 3/5 to 9/10 length of the total carrier length. In this catalyst, Rh, which is effective for conversion of $NO_x$, is supported on the entire catalyst layer. That is, Pd and Rh are supported on the upstream portion, and Pt and Rh are supported on the downstream portion.

In Japanese Patent Application Kokai (Laid-open) No. 101813/1991, there is disclosed a similar three-way catalyst which is a catalytic converter having an improved light-off performance at low temperatures. It is a catalytic converter comprising a plurality of catalysts for exhaust gas purification, wherein the catalyst at the exhaust gas inlet contains only Pd, the catalyst at the exhaust gas outlet contains Rh and Pt, or Rh, Pt and Pd, and the volume ratio of the former catalyst and the latter catalyst is 1:8 to 3:1.

The three-way catalyst disclosed in Japanese Patent Publication No. 38892/1991, however, was developed with the aim of allowing the catalyst to have an improved oxygen storability and have an activity in the vicinity of stoichiometric air-fuel ratio, and no performance at a fuel-lean side or at cold start was considered in the development. Further, in the above catalyst, the alumina layer has a large thickness of 20–40 mm and hinders gas diffusion into the catalyst layer containing Rh (Rh is most effective for the reduction and removal of $NO_x$). Thus, the catalyst is not complete as a three-way catalyst.

Each of the catalysts each supported on an electrically heated catalyst (EHC), disclosed in Japanese Utility Model Application Kokai (Laid-open) No. 67609/1988, Japanese Patent Application Kohyo No. 500911/1991 and Japanese Patent Application Kokai (Laid-open) No. 72953/1991 is a conventional three-way catalyst and has a catalyst component (e.g. noble metal) supported on a refractive metal oxide (e.g. $Al_2O_3$). Neither composition nor structure preferable for use with an electrically heated catalyst (EHC) is disclosed in any of the above documents.

The catalyst disclosed in Japanese Patent Application Kokai (Laid-open) No. 56247/1990 has no activity at a fuel-lean side where hydrocarbons can be oxidized and converted at a high efficiency. Thus, the catalyst has an insufficient activity for hydrocarbons.

The catalyst for exhaust gas purification disclosed in Japanese Patent Application Kokai (Laid-open) No. 84635/1988 is prepared by (1) dipping, in a Pd compound solution, the gas inlet portion of a carrier whose wall surface is coated with alumina or the like, by a desired distance, followed by drying and firing, (2) dipping, in a Pt compound solution, the gas outlet portion of the carrier by a desired distance, followed by drying and firing, and (3) dipping the entire catalyst layer in a Rh compound solution to impregnate the entire catalyst layer with Rh, followed by drying and firing. In this catalyst, since Rh and Pt or Pd (they form an alloy easily) are supported without being separated from each other, they form an alloy easily. Thus, the catalyst has low heat resistance.

Also in the catalytic converter disclosed in Japanese Patent Application Kokai (Laid-open) No. 101813/1991, no measure is taken for the prevention of alloy formation between Rh and Pt or Pd. Further, the catalytic converter was developed with the aim of improving the hydrocarbon conversion at a fuel-rich side and is not intended to improve the hydrocarbon conversion at a fuel-lean side in the presence of secondary air. Furthermore, the catalytic converter is not suitable as a heater type catalyst.

The present invention has been made in view of the above situation. The present invention is intended to provide (1) a catalyst for exhaust gas purification which can remove hydrocarbons efficiently at a fuel-lean side and which has an appropriate composition and structure also when viewed as a catalyst supported on the EHC, and (2) a method for exhaust gas purification which can convert unburnt hydrocarbons which are present in a large amount in the exhaust gas from a gasoline engine of an automobile at the engine start, at a high efficiency by using the above catalyst and introducing secondary air in front of the catalyst.

SUMMARY OF THE INVENTION

According to the present invention, there is provided, as a first catalyst for exhaust gas purification, a catalyst for exhaust gas purification, comprising
  at least one monolith carrier,
  at least one first catalyst layer having a three-way catalytic activity, provided on the carrier, and
  a second catalyst layer having a hydrocarbon purification activity, provided on the first catalyst layer.

There is also provided, as a second catalyst for exhaust gas purification, a catalyst for exhaust gas purification, comprising
  at least one monolith carrier,
  at least one upstream portion catalyst layer having a hydrocarbon purification activity, coated on the upstream portion of the monolith carrier, and
  at least one downstream portion catalyst layer having a three-way catalytic activity, provided on the downstream portion of the monolith carrier, wherein the outermost layer of the upstream portion catalyst layer contains at least either of Pt and Pd as the active catalyst component and the downstream portion catalyst layer contains at least Rh as the active catalyst component.

There is further provided, as a third catalyst for exhaust gas purification, a catalyst for exhaust gas purification, comprising,
  at least one monolith carrier,
  at least one upstream portion catalyst layer having a hydrocarbon purification activity, coated on the upstream portion of the monolith carrier, and
  a downstream portion catalyst layer provided on the downstream portion of the monolith carrier, said catalyst layer comprising at least one first catalyst layer having a three-way catalytic activity and a second catalyst layer having a hydrocarbon purification activity, coated on the first catalytic layer, wherein the outermost layer of the upstream portion catalyst layer and the second catalyst layer of the downstream portion catalyst layer contain either of Pt and Pd as the active catalyst component and the first catalyst layer of the downstream catalyst layer contains at least Rh as the active catalyst component.

Furthermore, according to the present invention, there is provided as a method for exhaust gas purification using one of the above catalysts for exhaust gas purification, a method for exhaust gas purification, which comprises introducing, at the engine start of gasoline engine automobile, secondary air into the exhaust gas in front (at the upstream side) of the above-mentioned first, second or third catalyst for exhaust gas purification, provided in the exhaust gas system.

DETAILED DESCRIPTION OF THE INVENTION

Figure 1:
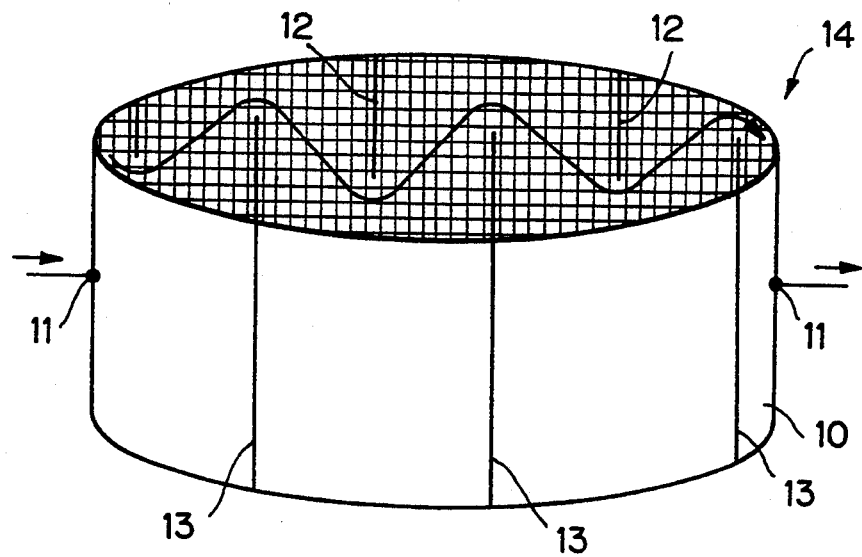
FIG. 1 is a drawing showing a honeycomb heater.

In the first catalyst for exhaust gas purification according to the present invention, the first catalyst layer having a three-way catalytic activity comprises at least one layer and preferably contains at least Rh. The content of Rh is preferably 1-15 g/ft per volume of monolith carrier for durability, $NO_x$-reducing activity, etc. of catalyst, but is most preferably 1.5-10 g/ft because of the high cost of Rh.

In the first catalyst layer, there can be used, as the catalyst metal other than Rh, a noble metal such as Pt, Pd or the like as necessary. However, since Rh easily forms an alloy with Pt or Pd, causing catalyst deactivation, Rh and Pt or Pd are preferably arranged separated from each other. For example, Rh and Pt are loaded on respective substrates and then arranged in the form of a mixed catalyst layer; or a substrate containing Rh and a substrate containing Pt are arranged in layers. Of them, the latter arrangement is preferable because it can prevent alloy formation substantially completely; such a latter arrangement as the outermost layer contains Rh, is more preferable because it has higher $NO_x$ reduceability and removabillty.

In order for the first catalyst layer to exhibit the three-way catalytic activity appropriately, it is preferable to add to the first catalyst layer at least one rare earth element oxide such as $CeO_2$, $La_2O_3$ or the like having oxygen storability. The amount of the rare earth element oxide added is preferably 5-30% by weight based on the substrate in order to widen the operating range (window) of the three-way catalyst and improve the heat resistance of the substrate.

Rh and $CeO_2$ or the like are contained in the first catalyst layer preferably in separation from each other because Rh easily forms a solid solution with $CeO_2$ or the like, causing deactivation.

$CeO_2$ or the like is used preferably in the form of a compound oxide with $ZrO_2$ because it gives improved oxygen storability.

The substrate of the first catalyst layer is preferably composed mainly of alumina and/or zirconia. As the alumina, there is preferably used so-called active alumina having a specific surface area of 50 m²/g or more. Active alumina having a specific surface area of 100 m²/g or more is more preferable because it has a higher ability for dispersing a noble metal and better light-off performance at low temperatures. Rh can well exhibit its performance even when supported on active alumina; however, since Rh has a relatively strong interaction with active alumina and forms a solid solution at a fuel-lean side causing deactivation, Rh is preferably supported on alumina or zirconia each of 50 m²/g or less.

The total amount of noble metal(s) used in the first catalyst layer is preferably 20–80 g/ft³ in view of the catalytic activity and cost. The layer thickness of the first catalyst layer is preferably 20–50 μm in view of the catalytic activity and layer adhesion.

Preferably, a transition metal such as Ni, Co, Fe, Cu or the like is used in the first catalyst layer as necessary in an amount of 1–10% by weight based on the substrate, because it exhibits various auxiliary catalytic activities.

Next, description is made on the second catalyst layer having a hydrocarbon purification activity. Similarly to the first catalyst layer, the second catalyst layer comprises at least one layer and preferably contains at least either of Pt and Pd. Containing Pt, Pd or both in an amount of 5–50 g/ft³ is preferable for conversion of hydrocarbons and CO at cold start. When the content is less than 5 g/ft³, the second catalyst has an insufficient purification; when the content is more than 50 g/ft³, the selective reduction of NO into $N_2$ during steady state operation is hindered and the cost of noble metal is higher. The most preferred catalyst component is Pd which is less expensive and has a light-off performance at low temperatures. Rh can be added as necessary but is preferably used in a range of 1–5 g/ft³. When Rh is added, a measure as mentioned above is preferably taken to prevent alloy formation between Rh and Pt or Pd.

The substrate used in the second catalyst layer is preferably composed of active alumina. As necessary, zeolite can be added. Zeolite addition allows the second catalyst layer to have an improved hydrocarbon purification activity because zeolite selectively adsorbs hydrocarbons at cold start and desorbs them with engine warm-up. The amount of zeolite added is 5–50% by weight based on active alumina. The zeolite preferably has a Si/Al ratio of 40 or more in view of the heat resistance of the second catalyst layer.

Use of a rare earth element oxide such as $CeO_2$, $La_2O_3$ or the like having oxygen storability is not particularly required, but use of said oxide in an amount of 5–30% by weight based on the substrate is preferable in view of the catalytic activity during ordinary operation.

The layer thickness of the second catalyst layer having a hydrocarbon purification activity is 2–20 μm and is required to be smaller than that of the first catalyst layer having a three-way catalytic activity. When the layer thickness is smaller than 2 μm, the second catalyst layer exhibits no hydrocarbon purification activity as desired; when the layer thickness is larger than 20 μm, a three-way reaction takes place predominantly in the second catalyst layer and, as a result, the first catalyst layer having a three-way catalytic activity provided inside the second catalyst layer does not act efficiently.

In the second catalyst layer, it is possible to add, as necessary, a transition metal such as Zr, Ni, Co, Fe. Cu, Re or the like as a promoter.

The total amount of noble metals used in the first catalyst for exhaust gas purification according to the present invention is preferably 30–130 g/ft³ in view of cost and catalyst activity.

Then, description is made on the formation of the first catalyst layer having a three-way catalytic activity.

First, to a substrate composed of active alumina is added 3–10% by weight (in terms of rare earth element oxide) of an aqueous solution of a rare earth element such as Ce or the like by, for example, an impregnation method or a coprecipitation method; and the mixture is fired at 500°–950° C. to obtain an active alumina-rare earth element oxide compound oxide. (This enables, in a later step, the loading of noble metal(s) in a uniformly dispersed state.) Then, the compound oxide is pulverized by a wet method in the presence of a peptizer such as acid, amine or the like; as necessary, at least one rare earth element oxide is added; further, an aqueous solution of noble metal(s) such as Rh, Pd, Pt and/or the like is added to obtain a desired slurry. The slurry is coated on a monolith carrier, dried, and fired at 500°–950° C. to obtain a first catalyst layer having a three-way catalytic activity.

It is possible to dry the above slurry itself, calcine the dried material at 500°–950° C. to obtain a compound oxide comprising a substrate and noble metal(s) fixed on the substrate, disintegrate the compound oxide by a wet method using a peptizer, and coat the resulting slurry on a monolith carrier. This method is preferable in view of the durability of the first catalyst layer obtained because the noble metal(s) and the substrate have an appropriate interaction with each other in the first catalyst layer.

When the first catalyst layer is formed in a plurality of layers, the layers are formed by the above two methods. In this case, the firing for the first layer is not essential.

The outermost layer of the first catalyst layer having a three-way catalytic activity, which contains Rh as the main catalyst component, can be formed on a monolith carrier by the above method. The substrate on which Rh is supported is preferably alumina and/or zirconia each having a specific surface area of 50 m²/g or less, in view of the durability of the first catalyst layer obtained. In order to avoid direct contact between Rh and a rare earth element oxide (e.g. $CeO_2$), it is possible to disintegrate desired proportions of active alumina, alumina and/or zirconia (each having a specific surface area of 50 m²/g or less), etc. by a wet method, add thereto an aqueous Rh salt solution and, as necessary, a $CeO_2$ powder, and coat the resulting slurry on a monolith carrier.

In this case also, it is possible to dry the above slurry itself, calcine the dried material at 500°–950° C. to obtain a compound oxide comprising a substrate and Rh fixed on the substrate, disintegrate the compound oxide by a wet method, and coat the resulting slurry on a monolith carrier.

In the most preferable example of the formation of the outermost layer, Rh is fixed on alumina or zirconia each having a specific surface area of 50 m²/g or less or on a compound oxide thereof and then is coated to form an outermost layer. Or, it is possible to add, to the Rh-fixed substrate obtained above, a necessary amount of an active alumina-rare earth element compound oxide (the rare earth element may be added in the form of an oxide) and coat the resulting slurry to form an outermost layer. As a result, Rh's contact with Ce, Pt and Pd can be prevented substantially and Rh can have significantly improved heat resistance.

Then, description is made on the formation of the second catalyst layer having a hydrocarbon purification activity. The second catalyst layer is formed by the same method as used for the first catalyst layer having a three-way catalytic activity, except that the second catalyst layer uses Pt or Pd as the main catalyst component. In the first catalyst for exhaust gas purification according to the present invention, it is necessary that Pt or Pd are substantially present at concentrated state in the outermost layer. A substrate containing no noble metal is coated on the first catalyst layer and then Pt or Pd is applied to form an outermost catalyst layer; or, Pt or Pd is applied onto the first catalyst layer by an adsorption method or an impregnation method.

Next, description is made on the second and third catalysts for exhaust gas purification according to the present invention.

In each of the second and third catalysts for exhaust gas purification according to the present invention, the upstream portion catalyst layer having a hydrocarbon purification activity comprises a single layer or a plurality of layers, and the outermost layer contains at least either of Pt and Pd as the active catalyst component.

Pt is effective for hydrocarbon conversion at high temperature, and unsaturated hydrocarbon conversion and Pd is particularly effective for hydrocarbon conversion at low temperatures. Therefore, the outermost layer of the upstream portion catalyst layer preferably contains Pd as the main catalyst component and, as necessary, can contain both Pd and Pt.

The upstream portion catalyst layer may comprise (1) a single layer containing substantially Pd alone as the main catalyst component or (2) a plurality of layers comprising an outermost layer containing Pd alone and a layer containing at least Rh, provided inside the outermost layer.

In case (1), since the light-off performance at low temperatures is improved, the reaction heat generated in the upstream portion catalyst layer is utilized for heating the downstream portion catalyst layer; as a result, the warm-up property of catalyst is improved and the purification activity of catalyst at cold start is improved. In case (2), there are obtained (a) the warm-up property of catalyst due to the above-mentioned light-off performance at low temperatures by Pd contained in the outermost layer and (b) the $NO_x$-converting activity at high temperatures due to Rh contained in the inner layer. As another preferable example, the upstream portion catalyst layer may comprise an outermost layer containing Pd, an intermediate layer containing Rh and an innermost layer containing Pt.

As in the first catalyst for exhaust gas purification, Rh must be supported in separation from Pt or Pd because Rh easily forms an alloy therewith and causes deactivation.

The total amount of noble metal(s) used in the upstream portion catalyst layer is preferably 30–130 g/ft$^3$ in view of the catalyst cost and activity. For example, when Pd, Rh, Pt, etc. are used in a plurality of layers, Pd is preferably used in an amount of 5–60 g/ft$^3$; Rh in an amount of 1–15 g/ft$^3$; and Pt in an amount of 5–60 g/ft$^3$. Since Rh is extremely expensive, it is particularly preferably used in an amount 1.5–10 g/ft$^3$.

The upstream portion catalyst layer must have a hydrocarbon purification activity. Its substrate uses alumina and/or zeolite and, as necessary, zirconia as the main component. The detailed description on these substrates, additives, etc. is the same as that made for the first catalyst for exhaust gas purification.

The thickness of the upstream portion catalyst layer is preferably 20–70 μm in view of the pressure loss and the catalytic activity. When the upstream portion catalyst layer comprises a plurality of layers comprising, for example, an outermost layer containing at least either of Pd and Pt and a layer containing Rh, provided inside the outermost layer, the thickness of the outermost layer is preferably 2–20 μm. When the thickness of the outermost layer is smaller than 2 μm, the outermost layer exhibits no desired hydrocarbon purification activity; when the thickness is larger than 20 μm, the inner layer containing Rh exhibits no desired $NO_x$-reducing activity.

The catalyst length of the upstream portion catalyst layer is preferably 1/10 to 3/5 of the total catalyst length. When the catalyst length is less than 1/10, no desired hydrocarbon purification activity at low temperatures can be expected and the heating of the downstream portion catalyst layer by the reaction heat generated in the upstream portion catalyst layer becomes insufficient. When the catalyst length is larger than 3/5, a three-way reaction occurs predominantly in the upstream portion catalyst layer particularly at high temperatures and, when the upstream portion catalyst layer contains no Rh, $NO_x$ is not converted into $N_2$ and generates $NH_3$ which is a by-product. The catalyst length of the upstream portion catalyst layer is more preferably 1/10 to 3/10 when the upstream portion catalyst layer contains no Rh, and 3/10 to 3/5 when the upstream portion catalyst layer contains Rh. These lengths are effective to reduce the amount of $NH_3$ (a by-product) generated.

The upstream portion catalyst layer may be provided on the upstream portion of a single monolith carrier, or on the whole portion or the upstream portion of the most upstream monolith carrier of a plurality of monolith carriers.

The downstream portion catalyst layer in the second catalyst for exhaust gas purification comprises a single layer or a plurality of layers and contains at least Rh as the active catalyst component. In the downstream portion catalyst layer which is heated by the reaction heat generated in the upstream portion catalyst layer, a three-way reaction takes place predominantly and the presence of Rh is essential in order to reduce and remove $NO_x$, in particular. To attain this purpose, it is preferable that Rh be used as a main component the outermost layer of the downstream portion catalyst layer.

The downstream portion catalyst layer in the third catalyst for exhaust gas purification comprises (1) at least one first layer containing at least Rh and having a three-way catalytic activity and (2) a second catalyst layer (a thin layer of 2–20 μm in thickness) containing Pd or Pt and having hydrocarbon purification activity, provided on the first catalyst layer. Such a structure is preferable in view of the improved warm-up property of catalyst. Also in this catalyst layer, use of Rh as a main component in the outermost layer of the first catalyst layer is preferable to reduce and remove $NO_x$. In the second catalyst layer, use of Pd as a main component catalyst is preferable.

In the downstream portion catalyst layer, it is preferable that a layer containing Pt or Pd be arranged as the outermost layer or inside the outermost layer of the first catalyst layer containing Rh as the main component, because this can save the amount of expensive Rh and yet provide a desired catalytic activity.

In the downstream portion catalyst layer, as in the upstream portion catalyst layer, Rh must be arranged in separation from Pt or Pd to avoid alloy formation between Rh and Pt or Pd.

In the downstream portion catalyst layer, the total amount of noble metals used, the amount of each noble metal used, and the thickness of catalyst layer are made the same as in the upstream portion catalyst layer. The thickness of the outermost layer containing Rh of the downstream portion catalyst layer or the thickness of the outermost layer of the first catalyst layer is preferably 5-20 μm in view of the $NO_x$-converting activity.

The substrate of the downstream portion catalyst layer is composed mainly of alumina and/or zirconia. The detailed description on these substrates, additives, etc. is the same as that made for the first catalyst for exhaust gas purification.

Description is made on the formation of catalyst layers in the second and third catalysts for exhaust gas purification. A slurry is prepared in the same manner as in the first catalyst for exhaust gas purification. This slurry is coated on the upstream portion of a monolith carrier (the whole portion or the upstream portion of the most upstream monolith carrier when the carrier is a plurality of monolith carriers) or on the downstream portion of a monolith carrier (the whole portion or the downstream portion of the most downstream monolith carrier when the carrier is a plurality of monolith carriers).

When the carrier is a single monolith carrier, the slurry is coated separately on the upstream portion and the downstream portion by, for example, reversing the carrier.

The carrier used in the first to third catalysts for exhaust gas purification according to the present invention may be a single monolith carrier or a plurality of monolith carriers. A single monolith carrier is preferable because of the low pressure loss, and a plurality of monolith carriers are preferable because gas mixing takes place between the monolith carriers, resulting in improved exhaust gas purification.

Since the catalysts for exhaust gas purification according to the present invention are used under severe conditions in the form of a catalytic converter, an electrically heated catalyst (EHC) or the like, the monolith carrier used therein preferably has a honeycomb structure made of a heat-resistant inorganic substance. Use of the present catalysts in the form of an electrically heated catalyst (EHC) is particularly preferable because the heater can increase the catalyst temperature very quickly and can conduct exhaust gas purification at cold start most efficiently.

As the electrically heated catalyst (EHC), a conventional foil type heater may be used. However, a heater made by powder metallurgy is preferable because it has no problem of mechanical strength and telescoping and has high reliability.

The monolith carrier preferably has a honeycomb structure made from cordierite or from metals capable of generating heat when electrified. The metallic honeycomb structure is particularly preferable because it has a high mechanical strength. The metallic honeycomb structure is composed of, for example, stainless steel, Fe-Cr-Al, Fe-Cr, Fe-Al, Fe-Ni, W-Co, Ni-Cr or the like. Fe-Cr-Al, Fe-Cr or Fe-Al is preferable because of the heat resistance, oxidation resistance, corrosion resistance and cost. The honeycomb structure may be porous or non-porous, but a porous honeycomb structure is preferable because it has high adhesion to the catalyst layer and gives rise to substantially no catalyst peeling caused by difference in thermal expansion between the honeycomb structure and the catalyst layer.

Then, description is made on an example of the production of a monolith carrier having a metallic honeycomb structure.

First, a material metal powder is prepared using, for example, a Fe powder, an Al powder and a Cr powder, or a powder of an alloy thereof so that they give a desired composition. The material metal powder is then mixed with an organic binder (e.g. methyl cellulose, polyvinyl alcohol) and water. The resulting mixture is subjected to extrusion molding to obtain a honeycomb body of desired shape.

The honeycomb body is fired at 1,000°–1,450° C. in a non-oxidizing atmosphere. Use of a non-oxidizing atmosphere containing hydrogen is preferable because the organic binder is decomposed and removed by the help of the catalytic action of Fe, etc. and, as a result, an excellent sintered body having a honeycomb structure is obtained.

When the firing temperature is lower than 1,000° C. the honeycomb body is not sintered. When the firing temperature is higher than 1,450° C., the sintered body obtained is deformed.

Desirably, the sintered body having a honeycomb structure is coated with a heat-resistant metal oxide, on the outer surface and the partition walls.

The resulting sintered body having a honeycomb structure is preferably provided with a resistance-adjusting means of a desired pattern between the electrodes which are described later.

Preferable examples of the resistance-adjusting means are as follows.

(1) Slits formed in desired directions, positions and lengths.

(2) Partition walls having different lengths in a passage axial direction.

(3) Partition walls of different thicknesses, or passages of different cell densities.

(4) Slits formed in partition walls. Of these, the resistance-adjusting means (1) is particularly preferable because the portions of the honeycomb heater to be heated can be selected and formed as desired.

Figure 2:
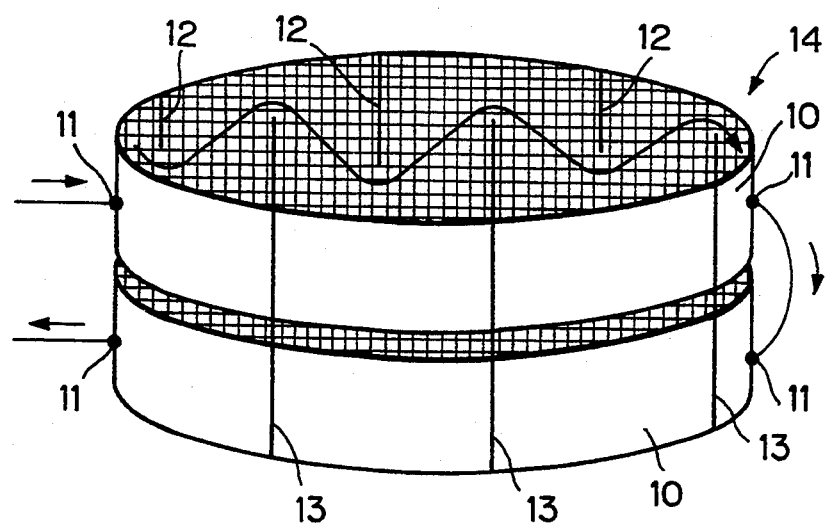
FIG. 2 is a drawing illustrating another example of a honeycomb heater.
Figure 3:
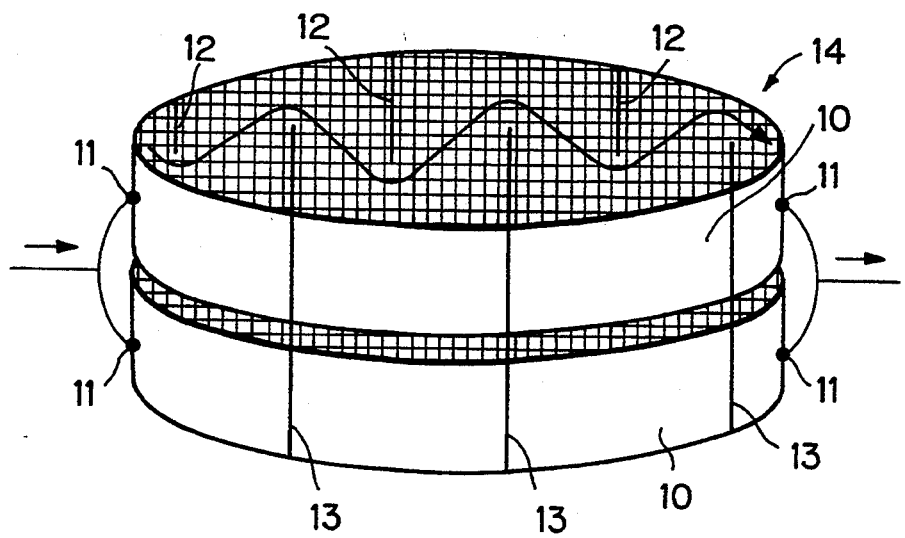
FIG. 3 is a drawing illustrating yet another example of a honeycomb heater.

The thus obtained metallic honeycomb structure is provided with electrodes ordinarily at the circumferential portions of some partition walls or inside, by brazing, welding or the like, to obtain a honeycomb heater. Incidentally, the electrodes used herein refer to any terminals for applying a voltage to the honeycomb heater. When the honeycomb heater consists of a plurality of monolith carriers each of honeycomb structure, the monolith carriers can be electrically connected in series or in parallel. FIG. 1 illustrates an example of a honeycomb heater possessing slits 12 as a resistance-adjusting means. The electrical flow shown by the arrow flows through electrodes 11 positioned on the outer periphery of the honeycomb heater and bends along the end of the slit 12. As examples of multiple monolith carriers which are electrically connected, FIG. 2 illustrates two monolith carriers in series while FIG. 3 shows them in parallel.

The heater is preferably formed so as to have a total resistance of 0.001–0.5 Ω.

The shape of honeycomb structure is not particularly restricted. But, as an example, such a specific shape is preferable that the cell density is 6–1,500 cells/in$^2$ (cpi$^2$) (0.9–233 cells/cm$^2$) and the partition wall thickness is 50–2,000 μm.

The honeycomb structure may be porous or non-porous as mentioned above and its porosity is not restricted. However, the porosity is preferably 0–50%, more preferably 5–25% in view of the strength oxidation resistance, corrosion resistance and adhesion to the catalyst layer.

Incidentally, in the present invention, the honeycomb structure refers to a one-piece structure having a large number of passages formed by partition walls, and the sectional shape (cell shape) of each passage may be any desired one such as circular, polygonal, corrugated or the like.

Next, description is made on the method for exhaust gas purification using one of the first to third catalysts mentioned above.

Each of the catalysts of the present invention exhibits its hydrocarbon purification activity most efficiently at cold start. Hence, it is necessary to introduce secondary air in front of the catalyst at engine start. It is because, when no secondary air is introduced, hydrocarbons and CO are not fully converted at engine start when the exhaust gas is at an excessively fuel-rich side and the catalyst warm-up by the heat generated by the conversion of hydrocarbons and CO is not sufficient.

The position of secondary air introduction is not restricted and may be any position between the engine exhaust port and the present catalyst. However, secondary air introduction in the vicinity of the exhaust port is particularly preferable because better mixing is obtained between the exhaust gas and secondary air. The amount of secondary air introduced depends upon the displacement of engine but is generally 50–300 l/min. The air-fuel ratio after secondary air introduction is adjusted to a stoichiometric to fuel-lean ratio (λ=about 0.9–1.5). Adjustment to a fuel-lean ratio of λ=about 1.0–1.3 is particularly preferable in view of the hydrocarbon conversion obtained. The period of secondary air introduction is generally from engine cranking to the start of λ sensor operation, and is about 60 seconds or less.

In order to obtain the highest purification at cold start, it is most preferable that each of the present catalysts be made in the form of an electrically heated catalyst (EHC), in which electrification and secondary air introduction are started after engine cranking and stopped in about 60 seconds or less. This gives higher conversions for hydrocarbons and CO than ordinary three-way catalysts do, and further enables the high utilization of the heat generated by the combustion of hydrocarbons and CO and significantly reduces the electric power to be supplied to the heater. Furthermore, the heater exhibits a three-way catalytic activity appropriately even during steady state operation after engine warm-up and is very effective.

Even when electrification is started before engine cranking (e.g. 30 seconds or less before engine cranking), exhaust gas purification can be conducted well.

The present invention is hereinafter described in more detail referring to Examples and FIG. 1. However, the present invention is not restricted to the Examples.

[Preparation of honeycomb heaters]

A pure Fe powder, a pure Cr powder, a Fe-50wt. % Al alloy powder, a Fe-20 wt. % B powder and a Fe-75 wt. % Si powder were compounded so as to give a composition of Fe-20Cr-5Al-1Si-0.05B (wt. %). Thereto were added an organic binder (methyl cellulose), an antioxidant (oleic acid) and water to prepare a bullet. The bullet was subjected to extrusion molding to obtain a honeycomb comprising square cells. The honeycomb was dried and fired at 1,350° C. in a H$_2$ atmosphere to obtain a honeycomb structure having a rib thickness of 4 mil and passages of 400 cpi$^2$.

The two kinds of honeycomb structures thus obtained were constructed as follows. In the honeycomb structure having an outside diameter of 90 mm, length 40 mm and 0.2 l volume (area of gas passage), there were formed six slits 12 each of 70 mm in length (two outermost slits had a length of 50 mm) in the passage axial direction so that the number of cells between the two adjacent slits 12 became 7 (about 10 mm) as shown in FIG. 1. As also illustrated in FIG. 1, in the honeycomb structure having an outside diameter of 120 mm, length 43 mm and 0.4 l volume (area of gas passage), there were formed 14 slits 12 each of 50 to 100 mm in length in the passage axial direction so that the number of cells between the two adjacent slits 12 became 5 (about 6 mm). Each of the resulting honeycomb structures was coated with catalysts by various methods described later. Then, the circumferential portion 13 of each slit 12 was filled with an inorganic adhesive made of heat-resistant ZrO$_2$ to form an insulation portion. On the side wall 10 of each honeycomb structure were set electrodes 11. Two of the same honeycomb structures of 90 mm in outside diameter, length 40 mm and 0.2 l in volume were connected in series with a 10 mm distance apart between them to prepare an A-type honeycomb heater of 0.4 l in volume. From the honeycomb structure of 120 mm in outside diameter, length 43 mm and 0.4 l in volume was prepared a B-type honeycomb heater. From the honeycomb structure of 90 mm in outside diameter, length 40 mm and 0.2 l in volume was prepared a C-type honeycomb heater of 0.2 l in volume.

In the case of the A-type honeycomb heater, an upstream portion catalyst layer was formed on the upstream portion honeycomb structure and a downstream portion catalyst layer was formed on the downstream portion honeycomb structure of 0.2 l in volume.

[Preparation of catalysts]

(1) Method A

A commercially available γ-Al$_2$O$_3$ having a BET specific surface area of 200 m$^2$/g was impregnated with an aqueous cerium nitrate solution so as to give a cerium content in alumina, of 6% by weight in terms of CeO$_2$, followed by calcination at 600° C. for 3 hours to obtain an alumina-ceria compound oxide. The compound oxide was pulverized by a wet method. To the pulverized compound oxide was added 24% by weight, based on γ-Al$_2$O$_3$, of a ceria powder. Further, a noble metal and an appropriate amount of acetic acid were added to obtain a slurry. The slurry was coated on a honeycomb structure, dried and fired at 550° C. for 3 hours to obtain a catalyst.

As necessary, a slurry containing a different noble metal, prepared in the same manner was further coated, dried and fired at 550° C. for 3 hours to obtain a catalyst. In the hater catalyst preparation, there was used, as a noble metal, dinitrodiaminine platinum, palladium nitrate or rhodium nitrate. When the noble metal was Rh, no cerium component was added to alumina.

(2) Method B

The slurry obtained in method (A) was dried at 100° C. for 15 hours and fired at 550° C. for 3 hours to obtain a noble metal-alumina-ceria compound oxide comprising an alumina-ceria compound oxide and a noble metal fixed on the compound oxide. An appropriate amount of acetic acid was added and disintegration was conducted by a wet method to obtain a slurry. The slurry was coated on a honeycomb structure, dried, and fired at 550° C. for 3 hours to obtain a catalyst.

As necessary, a slurry comprising an alumina-ceria compound oxide and a different noble metal fixed on the compound oxide, prepared in the same manner was further coated, dried and fired at 550° C. for 3 hours to obtain a catalyst. When the noble metal was Rh, no cerium component was added to alumina.

(3) Method C

At least two slurries each containing a different noble metal, obtained in method B were mixed to obtain a new slurry. The new slurry was coated in the same manner as in method B.

(4) Method D

A commercially available partially stabilized $ZrO_2$-powder (containing 3 mole % of $Y_2O_3$ and having a BET specific surface area of 16 m$^2$/g) was impregnated with Rh using an aqueous rhodium nitrate solution, followed by drying at 100° C. for 15 hours and calcination at 550° C. for 3 hours to obtain a Rh-containing $ZrO_2$ powder. Thereto were added an approproiate amount of acetic acid and 50 parts of a $\gamma$-$Al_2O_3$ powder. The mixture was pulverized by a wet method to obtain a slurry.

This Rh-$ZrO_2$-$Al_2O_3$ slurry was coated on the honeycomb heater comprising a honeycomb structure and a platinum-alumina-ceria compound oxide coated on the structure, obtained in method B. Then, drying and firing at 550° C. for 3 hours were followed to obtain a catalyst.

(5) Method E

The catalyst obtained in method D was impregnated with an aqueous palladium nitrate solution, followed by drying and firing at 550° C. for 3 hours to obtain a catalyst in which Pd was concentrated in the outermost catalyst layer.

(6) Method F

A slurry was obtained in the same manner as in method A except that Pt and Rh were added at the same time. In the catalyst obtained, both Pt and Rh were present uniformly in the catalyst layer.

(7) Method G

Using method B, the upstream portion of a honeycomb structure was coated with a slurry over a given length, followed by drying and firing at 550° C. for 3 hours. The honeycomb structure was inverted and, using method B, the downstream portion (the uncoated portion) was coated with a slurry, followed by the same drying and firing, whereby a catalyst was obtained.

(8) Commercially available three-way catalysts

Two commercially available three-way catalysts (6 mil/400 cpi$^2$, carrier=cordierite) were purchased and cut into the same volume as those of the honeycomb heaters of Examples.

By using the above methods A to G singly or in combination or by cutting the commerically available three-way catalysts, there were prepared catalysts of the following Examples and Comparative Examples.

EXAMPLE 1

A catalyst layer of 30 $\mu$m in thickness containing 35 g/ft$^3$ of Pt and 5 g/ft$^3$ of Rh was formed on a honeycomb heater by method C. On the surface of the catalyst layer was formed a catalyst layer of 10 $\mu$m in thickness containing 20 g/ft$^3$ of Pd, by method B to obtain a C-type honeycomb heater.

EXAMPLE 2

A catalyst layer of 20 $\mu$m in thickness containing 35 g/ft$^3$ of Pt was formed on a honeycomb structure by method B. On the surface of the catalyst layer was formed a catalyst layer of 10 $\mu$m in thickness containing 5 g/ft$^3$ of Rh, by method B. On the surface of the newly formed catalyst layer was formed a catalyst layer of 10 $\mu$m in thickness containing 20 g/ft$^3$ of Pd, by method B to obtain a C-type honeycomb heater.

EXAMPLE 3

A catalyst layer of 10 $\mu$m in thickness containing 5 g/ft$^3$ of Rh was formed on a honeycomb structure by method B. On the surface of the catalyst layer was formed a catalyst layer of 20 $\mu$m in thickness containing 35 g/ft$^3$ of Pt, by method B. On the surface of the newly formed catalyst layer was formed a catalyst layer of 10 $\mu$m in thickness containing 20 g/ft$^3$ of Pd, by method B to obtain a C-type honeycomb heater.

EXAMPLE 4

A catalyst layer of 20 mm in thickness containing 35 g/ft$^3$ of Pt was formed on a honeycomb structure by method B. On the surface of the catalyst layer was formed a catalyst layer of 10 $\mu$m in thickness containing 5 g/ft$^3$ of Rh, by method B. On the surface of the newly formed catalyst layer was formed a catalyst layer of 10 $\mu$m in thickness containing 10 g/ft$^3$ of Pt, by method B to obtain a C-type honeycomb heater.

EXAMPLE 5

A catalyst layer of 20 $\mu$m in thickness containing 35 g/ft$^3$ of Pt was formed on a honeycomb structure by method A. On the surface of the catalyst layer was formed a catalyst layer of 10 $\mu$m in thickness containing 5 g/ft$^3$ of Rh, by method A. On the surface of the newly formed catalyst layer was formed a catalyst layer of 10 $\mu$m in thickness containing 20 g/ft$^3$ of Pd, by method A to obtain a C-type honeycomb heater.

EXAMPLE 6

A catalyst layer of 10 $\mu$m in thickness containing 35 g/ft$^3$ of Pt was formed on a honeycomb structure by method B. On the surface of the catalyst layer was formed a catalyst layer of 10 $\mu$m in thickness containing 5 g/ft$^3$ of Rh, by method D. On the surface of the newly formed catalyst layer was formed a catalyst layer of 10 $\mu$m in thickness containing 20 g/ft$^3$ of Pd, by method B to obtain a C-type honeycomb heater.

EXAMPLE 7

A catalyst layer of 40 $\mu$m in thickness containing 35 g/ft$^3$ of Pt and 5 g/ft$^3$ of Rh was formed on a honeycomb structure by method C. The surface of the catalyst layer was impregnated with 20 g/ft$^3$ of Pd in a thickness of about 10 $\mu$m by method E to obtain a C-type honeycomb heater.

EXAMPLE 8

A catalyst layer of 40 μm in thickness containing 40 g/ft$^3$ of Pd was formed on the upstream portion of a honeycomb structure by method B. On the downstream portion of the honeycomb structure were formed, by method B, an inner catalyst layer of 30 μm in thickness containing 35 g/ft$^3$ of Pt and an outer catalyst layer of 10 μm in thickness containing 5 g/ft$^3$ of Rh, whereby a A-type honeycomb heater was obtained.

EXAMPLE 9

A honeycomb heater was obtained in the same manner as in Example 8 except that a catalyst layer of 40 μm in thickness containing 40 g/ft$^3$ of Pt was formed on the upstream portion of a honeycomb structure by method B.

EXAMPLE 10

An A-type honeycomb heater was obtained in the same manner as in Example 8 except that on the upstream portion of a honeycomb structure were formed, by method B, three layers, i.e. an innermost catalyst layer of 30 μm in thickness containing 35 g/ft$^3$ of Pt, an intermediate catalyst layer of 10 μm in thickness containing 5 g/ft$^3$ of Rh and an outermost catalyst layer of 10 μm in thickness containing 40 g/ft$^3$ of Pd.

EXAMPLE 11

An A-type honeycomb heater was obtained in the same manner as in Example 10 except that method A was used.

EXAMPLE 12

A catalyst layer of 40 μm in thickness containing 40, 5 and 35 g/ft$^3$ of Pd, Rh and Pt was formed on the upstream portion of a honeycomb structure by method C. On the downstream portion was formed, by method C, a catalyst layer of 40 μm in thickness containing 5 and 35 g/ft$^3$ of Rh and Pt, whereby an A-type honeycomb heater was obtained.

EXAMPLE 13

On the upstream portion of a honeycomb structure were formed three catalyst layers, i.e. an innermost catalyst layer of 30 μm in thickness containing 35 g/ft$^3$ of Pt, by method D, an intermediate catalyst layer of 10 μm in thickness containing 5 g/ft$^3$ of Rh, by method D and an outermost catalyst layer of 10 mm in thickness containing 40 g/ft$^3$ of Pd, by method B. On the downstream portion were formed, by method D, two catalyst layers, i.e. an inner catalyst layer of 30 μm in thickness containing 35 g/ft$^3$ of Pt and an outer catalyst layer of 10 μm in thickness containing 5 g/ft$^3$ of Rh, whereby an A-type honeycomb heater was obtained.

EXAMPLE 14

An A-type honeycomb heater was obtained in the same manner as in Example 13 except that on the upstream portion of a honeycomb structure were formed, by method D, two layers, i.e. an inner catalyst layer of 30 μm in thickness containing 35 g/ft$^3$ of Pt and an outer catalyst layer of 10 μm in thickness containing 5 g/ft$^3$ of Rh and that the outer catalyst layer of the upstream portion was impregnated with Pd by method E.

EXAMPLE 15

An A-type honeycomb heater was obtained in the same manner as in Example 12 except that method F was used.

EXAMPLE 16

A catalyst layer of 40 μm containing 40 g/ft$^3$ of Pd was formed on the upstream of a honeycomb structure by method B. On the downstream portion were formed, by method B, three catalyst layers, i.e. an innermost catalyst layer of 30 μm in thickness containing 35 g/ft$^3$ of Pt, an intermediate catalyst layer of 10 μm in thickness containing 5 g/ft$^3$ of Rh and an outermost catalyst layer of 10 μm in thickness containing 40 g/ft$^3$ of Pd, whereby an A-type honeycomb heater was obtained.

EXAMPLE 17

A catalyst layer of 40 μm in thickness containing 40 g/ft$^3$ of Pd was formed on the upstream portion of a honeycomb structure within the ½ length of the total catalyst length, by method G. On the downstream portion at the remaining length were formed, by method G, two catalyst layers, i.e. an inner catalyst layer of 30 μm in thickness containing 35 g/ft$^3$ of Pt and an outer catalyst layer of 10 μm in thickness containing 5 g/ft$^3$ of Rh, whereby a B-type honeycomb heater was obtained.

COMPARATIVE EXAMPLE 1

A catalyst layer of 40 μm in thickness containing 40 g/ft$^3$ in total of Pt and Rh (Pt/Rh=5/1) was fomred on a honeycomb structure by method F to obtain a C-type honeycomb heater.

COMPARATIVE EXAMPLE 2

A commercially available three-way catalyst was cut into the same volume as those of the honeycomb heaters of Examples. The catalyst comprised (1) a cordierite carrier of 6 mil/400 cpi$^2$ and (2) a catalyst layer of 40 μm in thickness containing a substrate of active alumina-ceria compound oxide and 40 g/ft$^3$ in total of Pt and Rh (Pt/Rh=5/1), formed on the carrier. In the catalyst, Pt and Rh were present uniformly in the catalyst layer, as in Comparative Example 1.

COMPARATIVE EXAMPLE 3

A commercially available three-way catalyst was cut into the same volume as those of the honeycomb heaters of Examples. The catalyst comprised (1) a cordierite carrier of 6 mil/400 cpi$^2$, (2) a catalyst layer of 30 μm in thickness containing a substrate of active alumina-ceria compound oxide and 40 g/ft$^3$ of Pt, formed on the carrier (1), and (3) a catalyst layer of 10 μm in thickness containing a substrate of active alumina-ceria compound oxide and 5 g/ft$^3$ of Rh, formed on the catalyst layer (2).

COMPARATIVE EXAMPLE 4

A catalyst layer of 40 μm in thickness containing 5 g/ft$^3$ of Rh was formed on the upstream portion of a honeycomb structure by method B. On the downstream portion were formed, by method B, two catalyst layers, i.e. an inner catalyst layer of 30 μm in thickness containing 35 g/ft$^3$ of Pt and an outer catalyst layer of 10 μm in thickness containing 5 g/ft$^3$ of Pd, whereby an A-type honeycomb heater was obtained.

COMPARATIVE EXAMPLE 5

A catalyst layer of 40 μm in thickness containing 5 g/ft³ of Rh was formed on the upstream portion of a honeycomb structure by method B. On the downstream portion were formed, by method B, two catalyst layers, i.e. an inner catalyst layer of 30 μm in thickness containing 35 g/ft³ of Pt and an outer catalyst layer of 10 μm in thickness containing 5 g/ft³ of Rh, whereby an A-type honeycomb heater was obtained.

[Evaluation methods]

(1) Durability test for catalyst

In order to estimate the life, each catalyst obtained in Examples and Comparative Examples was set so as to give a catalyst temperature of 750° C. and aged for a total of 100 hours by the fuel cut mode, using an exhaust gas generated in an actual automobile gasoline engine.

(2) Evaluation of catalyst performance at cold start

Figure 4:
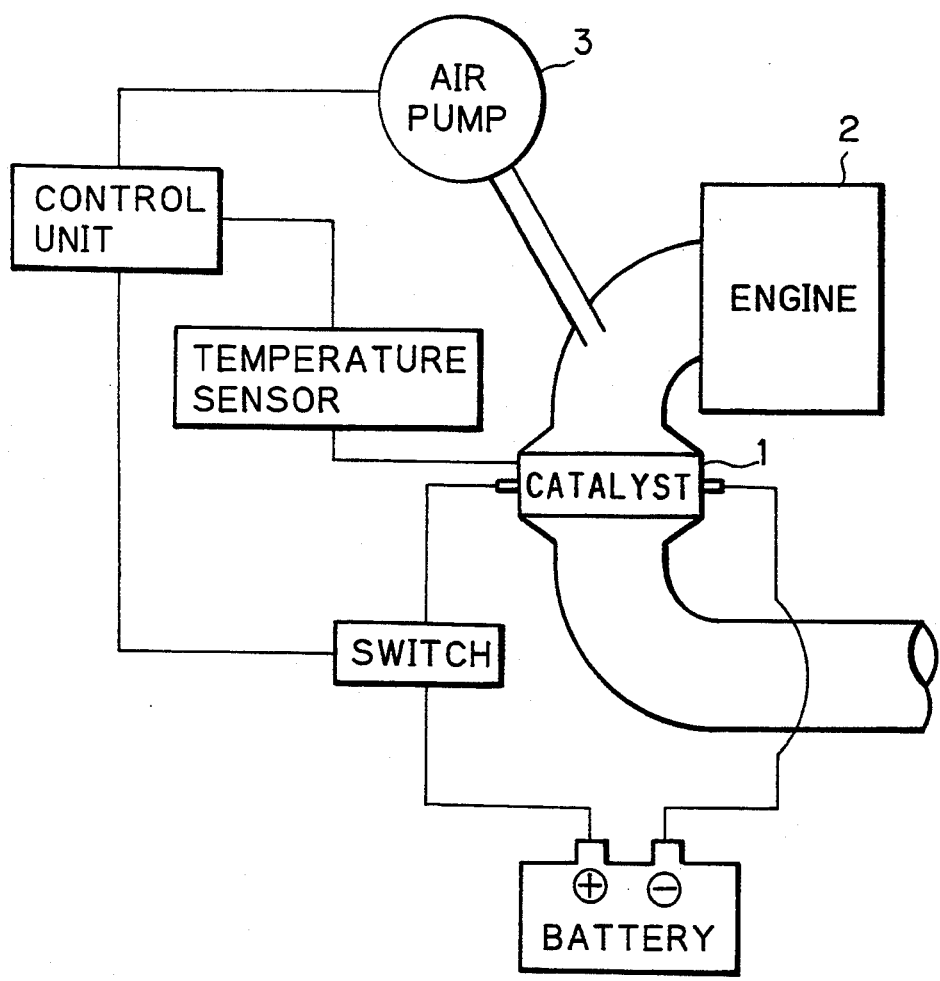
FIG. 4 is a drawing illustrating the construction of the apparatus used in the evaluation of catalyst performance at cold start.

Each catalyst after the above durability test was evaluated for exhaust gas purification performance at engine start, in accordance with Bag 1A Test of FTP. This test was conducted by means of the apparatus illustrated in FIG. 4.

The catalyst 1 after the durability test was set at a position 300 mm apart from the exhaust port of engine 2 and electrified for 60 seconds by on-off control so as to give a catalyst temperature of 450° C. during the electrification. Secondary air was introduced by air pump 3, at a position 100 mm apart from the exhaust port of engine 2 at a rate of 200 l/min for 40 seconds after engine start, whereby an atmosphere of λ=1.0 to 1.3 was kept. The exhaust gas purification performance when the catalyst was not electrified, was also evaluated. The results obtained are shown in Table 1.

TABLE 1

| | Bag 1A emission (g) | | | | | |
|---|---|---|---|---|---|---|
| | Not electrified | | | Electrified | | |
| | CO | HC | NO | CO | HC | NO |
| Example | | | | | | |
| 1 | 16 | 1.2 | 1.4 | 7.5 | 0.5 | 1.3 |
| 2 | 15 | 1.2 | 1.3 | 8.0 | 0.4 | 1.1 |
| 3 | 17 | 1.2 | 1.3 | 8.0 | 0.4 | 1.1 |
| 4 | 17 | 1.3 | 1.4 | 8.5 | 0.5 | 1.2 |
| 5 | 16 | 1.3 | 1.5 | 7.5 | 0.4 | 1.2 |
| 6 | 14 | 1.2 | 1.2 | 7.0 | 0.3 | 1.1 |
| 7 | 18 | 1.4 | 1.4 | 8.5 | 0.6 | 1.3 |
| 8 | 14 | 1.0 | 1.3 | 7.0 | 0.4 | 1.3 |
| 9 | 15 | 1.2 | 1.2 | 8.5 | 0.4 | 1.2 |
| 10 | 15 | 1.1 | 1.2 | 7.0 | 0.4 | 1.2 |
| 11 | 16 | 1.3 | 1.3 | 7.5 | 0.4 | 1.2 |
| 12 | 17 | 1.4 | 1.2 | 8.0 | 0.5 | 1.2 |
| 13 | 14 | 1.1 | 1.1 | 7.0 | 0.3 | 1.1 |
| 14 | 17 | 1.4 | 1.2 | 8.5 | 0.5 | 1.1 |
| 15 | 19 | 1.5 | 1.3 | 9.5 | 0.6 | 1.2 |
| 16 | 15 | 1.0 | 1.3 | 7.5 | 0.3 | 1.3 |
| 17 | 15 | 1.1 | 1.3 | 7.5 | 0.4 | 1.3 |
| Comparative Example | | | | | | |
| 1 | 22 | 1.6 | 1.3 | 10.5 | 0.8 | 1.1 |
| 2 | 19 | 1.7 | 1.4 | — | — | — |
| 3 | 20 | 1.6 | 1.2 | — | — | — |
| 4 | 22 | 1.7 | 1.2 | 10.5 | 0.8 | 1.2 |
| 5 | 20 | 1.6 | 1.1 | 11.0 | 0.8 | 1.1 |

As is clear from Table 1, the catalysts of Examples gave lower emission levels of CO and HC than the catalysts of Comparative Examples and were superior in exhaust gas purification. The catalysts of Examples, having an upstream portion catalyst layer having a HC-converting activity, showed a high HC-converting activity particularly when electrified.

When secondary air was introduced (but no electrification of heater), the catalysts of Examples gave a high purification efficiency and showed a good performance as a manifold converter.

When no secondary air was introduced, HC was 1.8 g, CO was 25 g and $NO_x$ was 1.4 g in both Examples and Comparative Examples. Therefore, the catalysts of Examples exhibited an effect when secondary air was introduced.

Each catalyst after the durability test was cut into a given shape and evaluated for (1) light-off performance (at a fuel-lean side and at a stoichiometric air-fuel ratio) and (2) performance under steady state operation, using a pseudo exhaust gas (an artificial exhaust gas). The catalysts of Examples were superior to those of Comparative Examples in three-way activity (high purification at low temperatures and 400° C.). Thus, it was confirmed that the catalysts of Examples are effective even during steady state operation after engine warm-up.

What is claimed is:

1. A catalyst for exhaust gas purification, comprising:
   at least one monolith carrier;
   a first catalyst layer having a three-way catalytic activity and comprising Rh as an active component; and
   a second catalyst layer having a hydrocarbon purification activity provided on said first catalyst layer, said second catalyst layer comprising at least one of Pt and Pd as an active component.

2. The catalyst of claim 1, wherein the second catalyst layer further comprises (i) a substrate composed mainly of at least one of alumina and zeolite, and (ii) a rare earth element oxide.

3. The catalyst of claim 1, wherein the first catalyst layer further comprises a substrate composed mainly of at least one of alumina and zirconia.

4. The catalyst of claim 3, wherein the first catalyst layer further comprises a rare earth element oxide.

5. The catalyst of claim 1, wherein the first catalyst layer includes a plurality of sub-layers, including a first sub-layer and an outermost second sub-layer provided on said first sub-layer, said second sub-layer containing Rh and having an $NO_x$-reducing activity.

6. The catalyst of claim 1, wherein the monolith carrier has a honeycomb structure and is comprised of a heat-resistant inorganic material.

7. The catalyst of claim 1, wherein said monolith carrier comprises a honeycomb structure and at least one pair of electrodes electrically connected to said honeycomb structure, said monolith carrier being adapted to generate heat when electrified.

8. The catalyst of claim 7, wherein said monolith carrier further comprises resistance adjusting means provided between the electrodes.

9. A catalyst for exhaust gas purification, comprising:
   at least one monolith carrier having an upstream portion and a downstream portion;
   a first catalyst layer having a hydrocarbon purification activity provided on said upstream portion of the monolith carrier, said first catalyst layer having an outermost portion comprising at least one of Pt and Pd as an active component; and
   a second catalyst layer having a three-way catalyst activity provided on said downstream portion of the monolith carrier, said second catalyst layer comprising Rh as an active component, wherein said at least one of Pt and Pd of said first catalyst layer and said Rh of said second catalyst layer are separated from each other to avoid contact between the Rh and said at least one of Pt and Pd.

10. The catalyst of claim 9, wherein said first catalyst layer comprises mainly Pd.

11. The catalyst of claim 10, wherein said first catalyst layer consists of Pd.

12. The catalyst of claim 9, wherein said first catalyst layer includes a plurality of sub-layers, including a first sub-layer, and a second sub-layer provided on said first sub-layer, said outermost portion consisting of said second sub-layer.

13. The catalyst of claim 12, wherein the second sub-layer contains said at least one of Pt and Pd.

14. The catalyst of claim 13, wherein the second sub-layer consists essentially of Pd.

15. The catalyst of claim 14, wherein the first sub-layer comprises Rh.

16. The catalyst of claim 9, wherein the second catalyst layer is comprised mainly of Rh.

17. The catalyst of claim 16, wherein the second catalyst layer consists of Rh.

18. The catalyst of claim 9, wherein the second catalyst layer includes a plurality of sub-layers, including a first sub-layer and an outermost second sub-layer provided on said first sub-layer.

19. The catalyst of claim 18, wherein said second sub-layer contains Rh.

20. The catalyst of claim 19, wherein said second sub-layer consists of Rh.

21. The catalyst of claim 19, wherein said first sub-layer contains at least one of Pt and Pd.

22. The catalyst of claim 9, wherein said first catalyst layer further comprises Rh which is separated from said at least one of Pt and Pd to prevent contact between the Rh and said at least one of Pt and Pd.

23. The catalyst of claim 9, wherein the second catalyst layer further comprises at least one of Pt and Pd which is separated from the Rh to prevent contact between the Rh and the at least one of Pt and Pd.

24. The catalyst of claim 9, wherein the first catalyst layer further comprises a substrate including at least one of alumina and zeolite.

25. The catalyst of claim 24, wherein said substrate further includes zirconia.

26. The catalyst of claim 24, wherein said first catalyst layer further comprises a rare earth element oxide.

27. The catalyst of claim 9, wherein the second catalyst layer further comprises a substrate including at least one of alumina and zirconia.

28. The catalyst of claim 27, wherein the second catalyst layer further comprises a rare earth element oxide.

29. The catalyst of claim 9, wherein the monolith carrier has a honeycomb structure and is comprised of a heat-resistant inorganic material.

30. The catalyst of claim 9, wherein said monolith carrier comprises a honeycomb structure and at least one pair of electrodes electrically connected to said honeycomb structure, said monolith carrier being adapted to generate heat when electrified.

31. The catalyst of claim 30, wherein said monolith carrier further comprises a resistance adjusting means provided between the electrodes.

32. A catalyst for exhaust gas purification, comprising:

at least one monolith carrier having an upstream portion and a downstream portion;

a first catalyst layer having a hydrocarbon purification activity provided on said upstream portion of the monolith carrier, said first catalyst layer having an outermost portion comprising at least one of Pt and Pd as an active component;

a second catalyst layer having a three-way catalytic activity provided on said downstream portion of the monolith carrier, said second catalyst layer comprising Rh as an active component; and a third catalyst layer provided on said second catalyst layer, said third catalyst layer having a hydrocarbon purification activity and comprising at least one of Pt and Pd as an active component.

33. The catalyst of claim 32, wherein the first catalyst layer comprises mainly Pd.

34. The catalyst of claim 33, wherein the first catalyst layer consists of Pd.

35. The catalyst of claim 32, wherein the first catalyst layer comprises a plurality of sub-layers, including a first sub-layer, and a second sub-layer provided on said first sub-layer, said outermost portion consisting of said second sub-layer.

36. The catalyst of claim 35, wherein the second sub-layer contains said at least one of Pt and Pd.

37. The catalyst of claim 36, wherein the second sub-layer consists essentially of Pd.

38. The catalyst of claim 37, wherein the first sub-layer contains Rh.

39. The catalyst of claim 32, wherein the third catalyst layer comprises mainly Pd.

40. The catalyst of claim 32, wherein the second catalyst layer includes a plurality of sub-layers, including a first sub-layer containing at least one of Pd and Pt, and an outermost second sub-layer comprising mainly Rh.

41. The catalyst of claim 32, wherein the first catalyst layer further comprises Rh which is separated from said at least one of Pt and Pd to avoid contact between the Rh and said at least one of Pt and Pd.

42. The catalyst of claim 32, wherein the Rh of said second catalyst layer and the at Least one of Pt and Pd of the first and third catalyst layers are separated from each other to avoid contact between the Rh and the at least one of Pt and Pd.

43. The catalyst of claim 32, wherein the second catalyst layer further comprises at least one of Pt and Pd which is separated form the Rh of the second catalyst layer to avoid contact between the Rh and the at least one of Pt and Pd.

44. The catalyst of claim 32, wherein said first catalyst layer further comprises a substrate containing mainly at least one of alumina and zeolite.

45. The catalyst of claim 44, wherein the substrate further comprises zirconia.

46. The catalyst of claim 45, wherein the first catalyst layer further comprises a rare earth element oxide.

47. The catalyst of claim 32, wherein the second catalyst layer further comprises a substrate composed mainly of at least one of alumina and zirconia.

48. The catalyst of claim 47, wherein the second catalyst layer further comprises a rare earth element oxide.

49. The catalyst of claim 32, wherein the monolith carrier has a honeycomb structure and is comprised of a heat-resistant inorganic material.

50. The catalyst of claim 32, wherein the monolith carrier comprises a honeycomb structure and at least one pair of electrodes electrically connected to the honeycomb structure, said monolith carrier being adapted to generate heat when electrified.

51. The catalyst of claim 50, wherein said at least one monolith carrier comprises a plurality of monolith carriers which are electrically connected to each other.

52. The catalyst of claim 51, wherein a resistance-adjusting means is provided between the electrodes of each monolith carrier.

* * * * *